Jan. 14, 1947. A. F. SHIELDS 2,414,336
PARTITION ASSEMBLING MACHINE ELEMENTS
Filed July 15, 1942 7 Sheets-Sheet 1

INVENTOR.
Albert F. Shields
BY
ATTORNEY

Jan. 14, 1947.  A. F. SHIELDS  2,414,336
PARTITION ASSEMBLING MACHINE ELEMENTS
Filed July 15, 1942  7 Sheets-Sheet 2
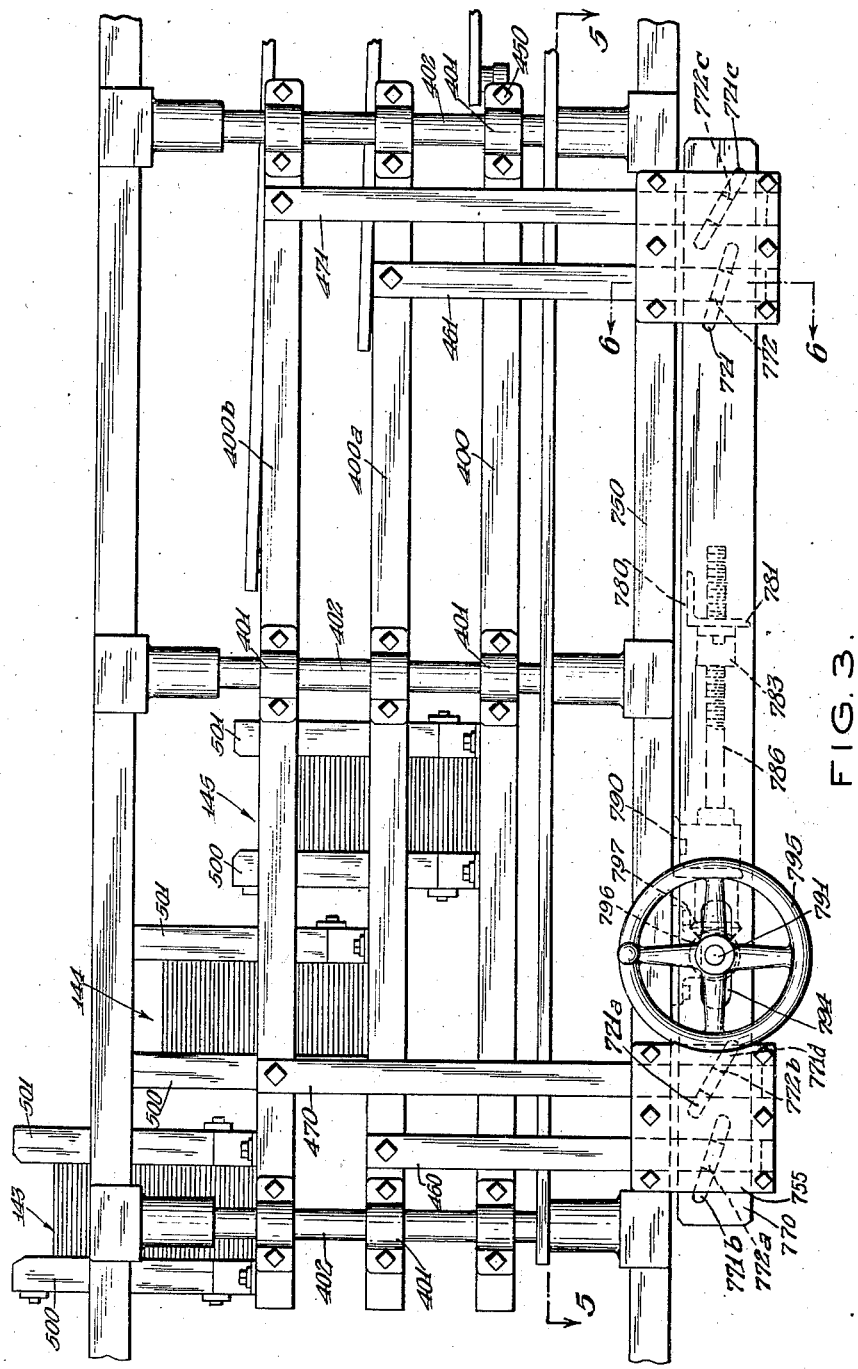
INVENTOR.
Albert F. Shields
BY
ATTORNEY

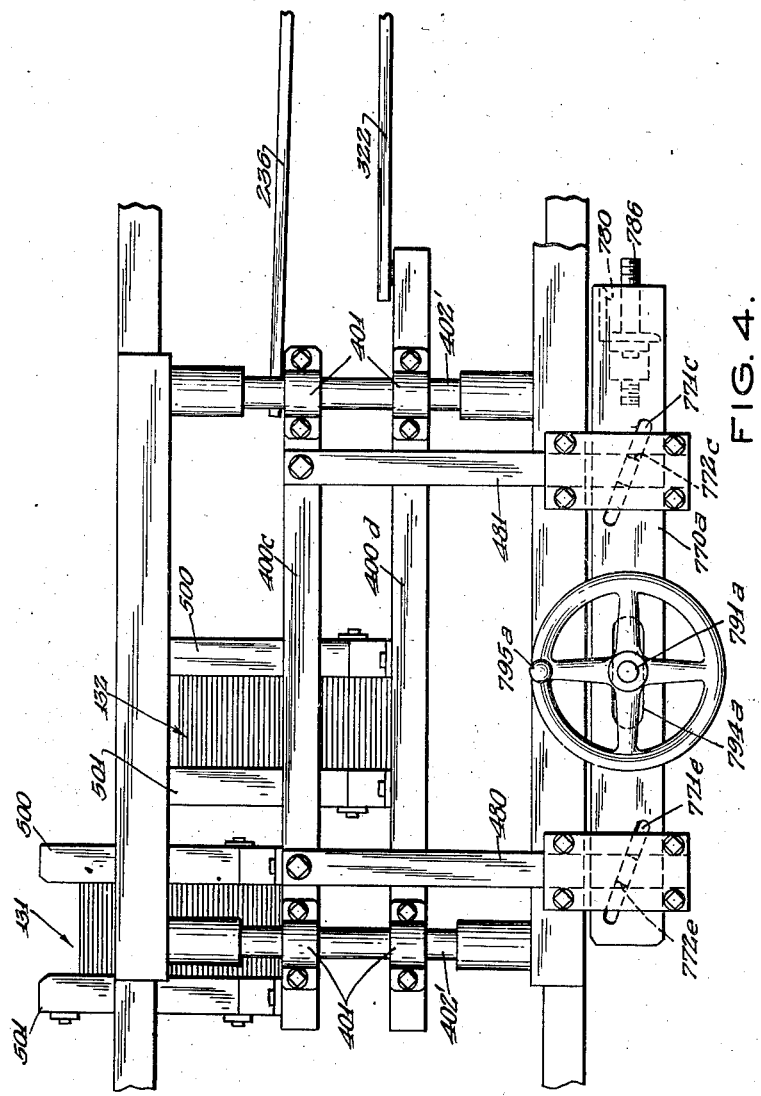

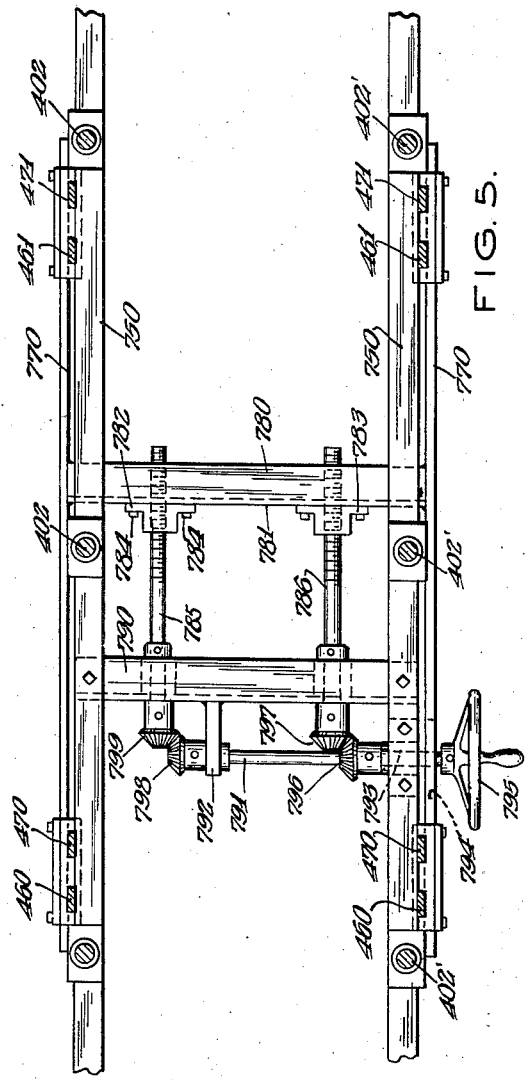
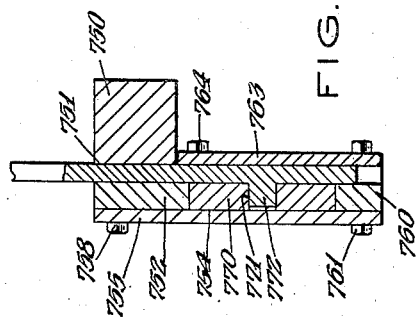

Jan. 14, 1947.  A. F. SHIELDS  2,414,336
PARTITION ASSEMBLING MACHINE ELEMENTS
Filed July 15, 1942  7 Sheets-Sheet 7
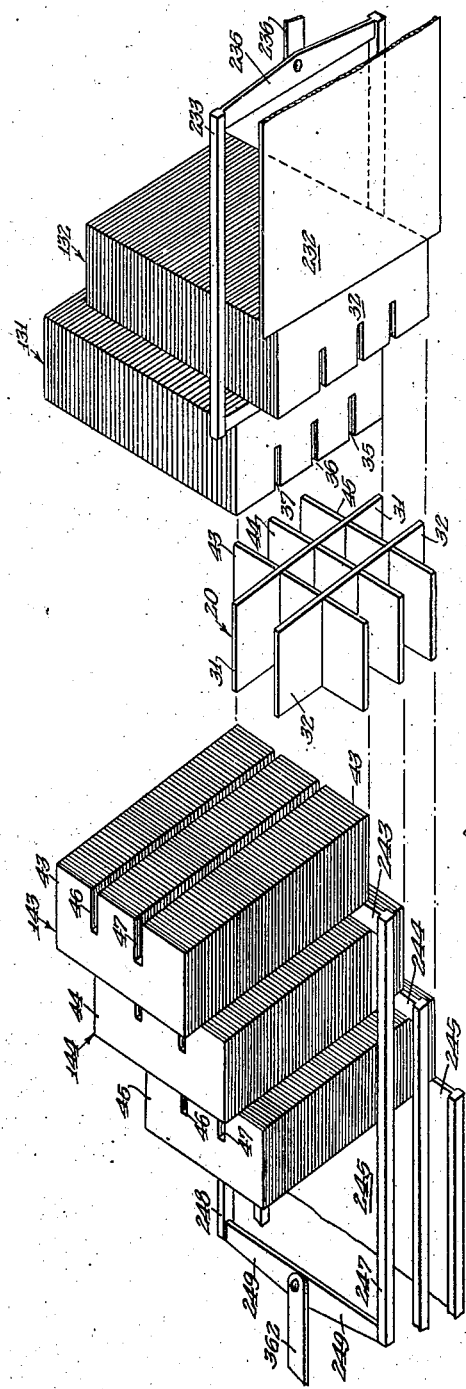
INVENTOR.
Albert F. Shields
BY
ATTORNEY Patented Jan. 14, 1947

2,414,336

UNITED STATES PATENT OFFICE 2,414,336

PARTITION ASSEMBLING MACHINE ELEMENTS

Albert F. Shields, Forest Hills, N. Y., assignor to S. & S. Corrugated Paper Machinery Co., Inc., Brooklyn, N. Y., a corporation of New York Application July 15, 1942, Serial No. 451,033

7 Claims. (Cl. 93—37)

My invention relates to partition assembling machines and is a continuation in part of my application Serial No. 391,702, filed May 3, 1941.

In the parent application above set forth, I have described a complete partition assembling machine which is adapted to rapidly form partition members from a plurality of notched blanks. My present invention relates to improvements in various portions of the structure of the aforementioned machine, particularly with respect to a simplified means of adjustment thereof, to form partitions of varying sizes and to various other improvements which facilitate the operation thereof and prevent the occurrence of any mistake on the part of the operator which will cause the sheets which are to be nested into partition form to buckle or tear during the operation. These improvements and the objects thereof will be more clearly understood after a full consideration and recapitulation of the objects of the machine in connection with which they are applied.

In the construction of containers of various kinds, it is sometimes necessary to provide a series of cubicles or partitions separating the container into a series of small containers. This is commonly necessary in containers which are designed for the shipment of a plurality of small, fragile items, each of which must be supported out of contact with adjacent units of the same type and each of which must be positively positioned in the container so that the same is cushioned against any rough handling.

Usually such partitions comprise a series of sheets extending at right angles to each other and notched so that they may intersect each other. In such partitions which are intended to be inserted in containers, there may therefore be two, three or more partitioning sheets extending in one direction and a number of partitioning sheets extending in a direction at right angles thereto.

In the usual type of partition, notches are provided, said notches extending to one edge of each of the sets of sheets running in one direction and the notches extending to the opposite edge of each of the sets of sheets running in the other direction. The notches are arranged so that when the sheets are placed in proper intersecting relation, the notches meet and a portion of the material of each sheet is caught in the corresponding notch of the intersecting sheet.

In order that the surfaces which define the edges of the sheets should be plane, the notches preferably are one-half the height of each of the sheets and the sheets are caused to intersect so that notch meets notch. When the sheets are therefore assembled in intersecting relationship, a regular partition having no projections may therefore be formed.

It is necessary, therefore, in the consideration of any machine which is to be utilized in the assembling of such partitions, to allow for the fact that the intersecting elements which form the completed partitions are or may always be placed at right angles to each other and that the simplest method of assembly is one which disposes the sheets so that they may be brought together while the said sheets are at right angles to each other so that no turning or further movement of the sheets in one bank will be necessary for registry with sheets of the opposite bank.

It was therefore an object of my machine to provide an apparatus for assembling partitions wherein the sheets which are to be arranged in intersecting partition form, may be mounted so that the set of sheets which, in the partition, are to run in one direction are appropriately mounted in a plurality of stacks and so that the set of sheets which, in the partition, are intended to run in a direction at right angles to the first set are arranged in a plurality of stacks which are at right angles to the first set of stacks.

A further object of my machine was the provision in partition assembling apparatus, of means for stacking each set of sheets which are to form the partition in such manner that the stacks are arranged at right angles to stacks of sheets which are to be intersected by sheets from the first stack.

A further object was to arrange the stacks so that the blanks may be fed by gravity and need not require any further feeding means.

Another object was the elimination of any matrix or carrying member for the assembled cell unit.

Still a further and important object was the provision in partition assembling apparatus, of means for simultaneously assembling all of the sheets which are to form the partition during a single operative movement.

The primary object of the present invention is the improvement of various elements of the foregoing machine, particularly with respect to the adjustment thereof to the formation of partitions of various sizes. In the original machine, the various stacks and feeding or connecting platforms were each individually adjustable to attain partitions of varying sizes. This type of adjustment has been found feasible in operation and commercially successful.

In order, however, to facilitate adjustment and cut down make ready time, an important object of the present invention is the provision of means for simultaneously adjusting all of the stacks on each side of the machine for partitions of various sizes. By this means, a single adjustment operation will perform the adjustment for two, three or more stacks simultaneously.

Also, in the operation of my machine, it has been found that the operator sometimes carelessly incorrectly places the notched blanks. Where the notched blanks are placed in the stack so that the notches face the wrong way (that is, away from the opposing set), then when the blanks are forced towards each other, the notches cannot engage and the sheet buckle and tear. This is the result of carelessness in stacking the blanks and does not occur where a careful operator tends the machine.

In order, however, to obviate any such occurrence, it is a further object of my invention to provide means in the stacking portion of my machine which will ensure that the blanks to be nested into partition form can only be placed correctly therein.

Likewise, in the operation of my machine, it has sometimes been found that where the notches are cut to close tolerances, the kicker or feeder bar may cause the blanks to shift as they move towards each other. This has occurred only where unskilled or careless operators have operated the machine. In order, however, to prevent even a careless operator from permitting this lack of registration to occur during the feeding operation, it is a further object of my invention to provide means in connection with the kicker or feeding bar to hold the partition blanks which are to be nested in exact registry during the feeding operation.

Also in my partition machine it has sometimes been found that where the speed of operation thereof is stepped up to a point where more than one hundred partitions per minute are being nested, the speed of movement sometimes causes the blanks during feeding thereof to rise slightly out of registry.

It is a further object of my invention to provide means for holding these blanks in registry and preventing the rise thereof during the feeding movement.

In all of the foregoing it should be noted that the machine above referred to has functioned successfully without any of these improvements and that when the machine is tended by a careful operator none of these elements may actually be essential. The principal reason for the incorporation of most of these elements is to permit rapid operation of the machine when even a careless or unskilled operator must be used.

The principal object of my present invention, therefore, is the provision of means for increasing the speed of adjustment and operation of my partition assembling machine.

These and many other objects of my present invention will become apparent in connection with the following specification and drawings in which:

Figure 2 is a plan view corresponding to that of Figure 1 taken from a similar plane above the machine inclined at forty-five degrees to the horizontal, the said plane being ninety degrees to the plane from which Figure 1 is viewed.

Figure 3 is a side view of a portion of my partition assembling machine taken from line 3—3 of Figure 2 and showing the stack adjustment apparatus for the left hand set of stacks.

Figure 4 is a side view taken from line 4—4 of Figure 1 and showing the stack adjustment apparatus for the right hand set of stacks.

Figure 5 is a cross sectional view partly in elevation taken on line 5—5 of Figure 3, looking in the direction of the arrows.

Figure 6 is a cross sectional view taken on line 6—6 of Figure 3 looking in the direction of the arrows.

Figures 11 and 12 are schematic representations of the operation of the mechanism.

Figure 1:
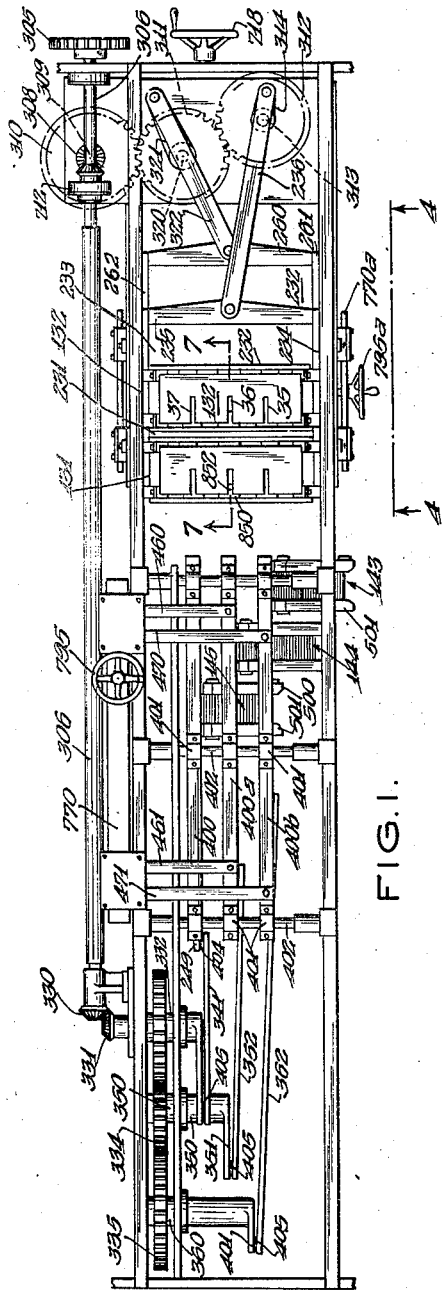
Figure 1 is a side elevational view of the machine shown in Figure 2 taken from a plane above the machine inclined forty-five degrees to the horizontal.

Referring now to the schematic view of Figures 11 and 12 which will serve more clearly to explain the invention before the specific apparatus which accomplishes the result therein shown is described, there are shown in these figures an assembled partition 20 consisting of sheets 31 and 32 which extend in one direction and sheets 43, 44 and 45 which extend in the opposite direction.

The sheets which in each assembled partition are eventually to form sheet 31 of the partition herein shown are placed in a stack 131. Likewise the sheets which are to form sheet 32 of the partition 20 are placed in a stack 132. Sheets which are to form the intersecting sheets 43, 44 and 45 of the partition 20 are likewise respectively placed in stacks 143, 144 and 145.

As will be clearly seen in Figure 11, the sheets 43 in stack 143 each have a pair of notches 46 and 47. Likewise each of the sheets 32 of stack 132 have a series of notches 35, 36 and 37. The other sheets in each set of stacks have the same notched arrangement.

Thus each of the sheets 31 in stack 131 has the same arrangement as sheets 32, and likewise each of the sheets 44 and 45 in stacks 144 and 145 has the same arrangement as sheet 43 of stack 143.

Sheets 31 and 32 are each provided with three notches since they are in the completed partition assembly 20 to intersect three cross-sheets, and each of the sheets 43, 44 and 45 has two notches since in the completed partition assembly they are each to intersect only two sheets.

Obviously any number of stacks may be on each side to produce a series of partitions having any other desired arrangement of sheets. As will also readily be seen from Figure 11, each of the stacks 131 and 132 is placed in the apparatus so that the sheets thereof are at right angles to the sheets in each of the stacks 145, 144 and 143.

Preferably, therefore, in the apparatus and in order to enable a gravity feed of all blanks, each of the stacks on one side of the completed partition is arranged at 45° from the vertical on one side of an imaginary vertical line drawn through the apparatus and each of the stacks on the opposite side of the partition to be assembled is placed at an angle of 45° on the other side of said imaginary line.

The bottoms of each of the stacks 131 and 132 are spaced apart by a distance equal to the space desired in the completed partition assembly between the sheets 31 and 32.

Similarly, the bottom of each of the stacks 143, 144 and 145 are spaced apart by the distance desired between the corresponding sheets on their side of the partition assembly. Or, to put it another way, the bottoms of stacks 131 and 132 are spaced apart so that the bottom sheet of stack 131 will register with notches 46 and so that the bottom sheet of stack 132 will register with notches 47 and the bottoms of stacks 143, 144 and 145 are spaced apart so that the bottom sheet of stack 143 extends in a plane which will intersect notches 37; the bottom sheet of stack 144 is in a plane which will intersect notches 36, sheets 32 and 31, and so that the bottom sheet of stack 145 is in a plane which will intersect notches 35 in each of the sheets 32 and 31.

The stacks may, if desired, be so arranged that the bottoms thereof may be spaced from each other by any desired distance in accordance with the distances between the notches above described and in accordance with the number of sheets in each direction which are to enter into the completed partition assembly.

In order to utilize this arrangement, I have found it necessary to provide means which will simultaneously move the bottom sheet out of each stack towards the center of the apparatus so that each sheet will be moved to engagement with the notches of the opposite sheet in the manner previously described.

The staggering of the bottom of the stacks shown in Figure 11 not only permits spacing the sheets so that they will intersect, but also provides the clearance between the bottom of one stack and the bottom of the next adjacent stack which is necessary to move the bottom sheet out from under each stack.

In the schematic embodiment shown, I have provided bar 231 which registers with the bottom sheet 31 of stack 131 and plate 232 which registers with the bottom sheet 32 of stack 132. Bar 231 is supported on rails 233 and 234 which are connected at the rear end by a cross bar 235 to which an operating link 236 may be pivotally connected. The rails 233 and 234 surround the stack 132 and are so arranged that the movement of the bar 231 into stack 131 and the movement of the rails necessitated thereby will not in any way interfere with stack 132.

The plate 232 may operate in the same manner as bar 131 but since plate 232 is at the lowest position in the machine where its movement will not interfere with any stacks, it may be a continuous plate and need not be formed in the rail-cross-bar-operating bar arrangement described with respect to bar 231.

Plate 232 and bar 231 are oscillated back and forth so that during each movement towards the left with respect to Figure 11, they simultaneously push out the bottom sheet from each of their respective stacks and so that by each movement towards the right with respect to Figure 11, they are reset in operating position once more with respect to their stacks.

The operation of plate 232 and bar 231 is such that each of the sheets 31 and 32 simultaneously reaches the point where the partition assembly 20 is to be assembled. Since sheet 32 must move through a greater distance, its speed will ordinarily be greater than that of sheet 31. However, this difference is reduced by the fact that the mechanism is so arranged in the manner hereinafter described, that plate 232 commences its kicking movement first—before plate 231.

The travel of sheet 32 is necessarily greater than that of sheet 31 since in addition to travelling the distance between the stacks and the point where the partitions are to be assembled, it must also travel through the additional width of stack 131.

The plate and bars are so arranged in their operation, therefore, that sheets 31 and 32 reach their final positions in the assembled state simultaneously. The same operation occurs with respect to stacks 143, 144 and 145. Bar 243 supported by rails 247 and 248, which in turn are braced by the cross bar 249, operates with respect to stack 143. Bar 244 operates with respect to stack 144, and plate 245 operates with respect to stack 145. The same type of operation occurs with respect to these latter bars as has previously been described with respect to bar 231 and plate 232. Here it is necessary that two bars be provided since there are three stacks. The bottom plate is provided instead of a bar for the same reason as has previously been described with respect to the bottom plate 232.

By this operation, therefore, all of the sheets which are to form the partition are ejected from the stacks in such a manner that each sheet registers with all of its intersecting sheets at the end of one movement.

The specific apparatus by which this is accomplished is shown in the remaining figures. Referring now to Figures 1 to 4, inclusive, I have here shown an apparatus which includes the driven gear 305, which may be driven from any suitable power source and which is mounted on and drives shaft 306.

Bevel gear 307 on shaft 306 meshes with bevel gear 308 on the shaft 309 which carries gears 310. Gear 310 drives gear 311 which in turn drives gear 312. Gear 312 is mounted on shaft 313 on which is also mounted the crank 314 to the end of which link 236 is pivotally connected. The opposite end of link 236 is pivotally connected to the cross bar 235 which, through the rails 233 and 234, is connected to the operating bar 231 in the manner previously described.

Rotation of the shaft 313 by the gear train previously described will result in rotation of the crank 314 and in corresponding oscillation of the link 236 and therefore in corresponding oscillation of the cross bar 231 which will result in the ejecting operation previously described. Gear 311 which is also driven by the gear train in the manner above mentioned, is mounted on shaft 320 to which is secured crank 321.

Link 322 is pivotally connected at one end to the crank 321 and at the opposite end is pivotally connected to the cross bar 260 which carries rails 261 and 262 on which the plate 232 is mounted. Rotation of shaft 320 will, in the manner already mentioned, with respect to cross bar 231, result in an oscillation of the plate 232, also for the purposes above mentioned. Also, as previously described, the rails 233 and 234 carry the cross bar 231 which operates upon the bottom sheet of stack 131. Similarly, plate 232, as previously described, operates upon the bottom sheet in stack 132.

The end of shaft 306 opposite the bevel gear 307 also carries a bevel gear 330 which meshes with bevel gear 331, which in turn is mounted on shaft 332. Shaft 332 carries gear 333 which meshes with gear 334 which, in turn, drives gear 335. Shaft 332 also carries crank 340 keyed thereto and rotatable therewith. Link 341 is at one end pivotally connected to crank 340 and at the opposite end is pivotally connected to the cross bar 249 which drives the operating link 245 in the manner previously described.

Gear 334 is mounted on shaft 350 on which is also mounted the crank 351. Link 352 is at one end pivotally connected to the crank 350 and at the opposite end is pivotally connected to the members which support the cross bar 244 previously described. Gear 335 is mounted on and operates the shaft 360 on which is also mounted the crank 361. Link 362 is pivotally connected at one end to the crank 360 and at the opposite end is pivotally connected to the members which operate the bar 243 previously described.

In Figure 3, the position of the parts of the machine is shown when the ejecting operation is commencing, and the partition has not yet been taken from the stack.

It will thus be seen that the members which operate on the lowest stacks have the greatest travel and that the members which operate on the uppermost stacks have the least amount of travel.

As is seen in Figures 1 and 3, a plurality of tracks 400, 400a, 400b are provided within which the rails of each of the operating members may ride. These tracks are adjustable as follows:

These tracks are adjustable with reference to their spacing to each other in order to accommodate the apparatus to various sizes of partitions and to various arrangements thereof. Each of the tracks has a plurality of mounting members or ears 401 by means of which the said tracks are secured on the post 402. The lugs, ears or mounting members 401 are adjustable on the posts 402 so that the tracks may be spaced apart by any selected distance, thus spacing the ejectors appropriately for each type of partition assembly operation.

The connection between the links and their respective cranks and operating members at for instance 404 (Figure 1) and 405, has sufficient play to permit the movement of the track members on the posts 402 without disconnecting the members from the links or without destroying the operative connection therebetween.

While the pivots 404 and 405 may have a certain amount of compliance to permit such an adjustment, they preferably do not have any lateral compliance so that the operative connection and adjustment remains the same.

As has already been pointed out, any number of stack supporting elements may be provided. The stacks, as may be seen in the figures, are supported by a plurality of front and back plates 500, 501, as well as appropriate side supporting means which may take any suitable form. The plates 500 and 501 are supported, however, in such a manner that they are not in contact with the bottom plate 900 of each of the stack supporting elements but are spaced therefrom by at least the thickness of one of the sheets.

Figure 7:
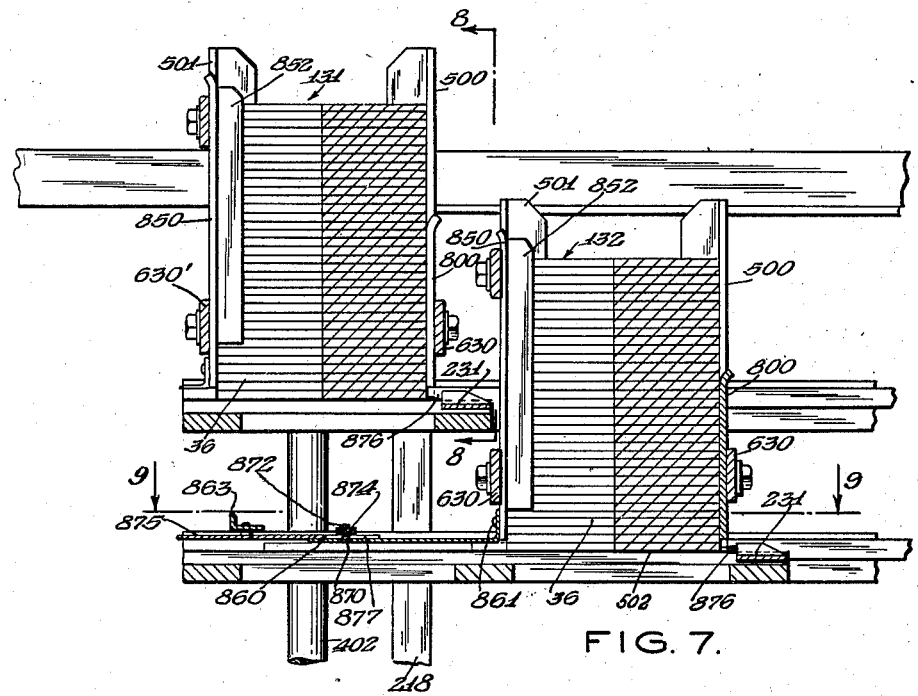
Figure 7 is a cross sectional view partly in elevation taken on line 7—7 of Figure 1, looking in the direction of the arrows.
Figure 8:
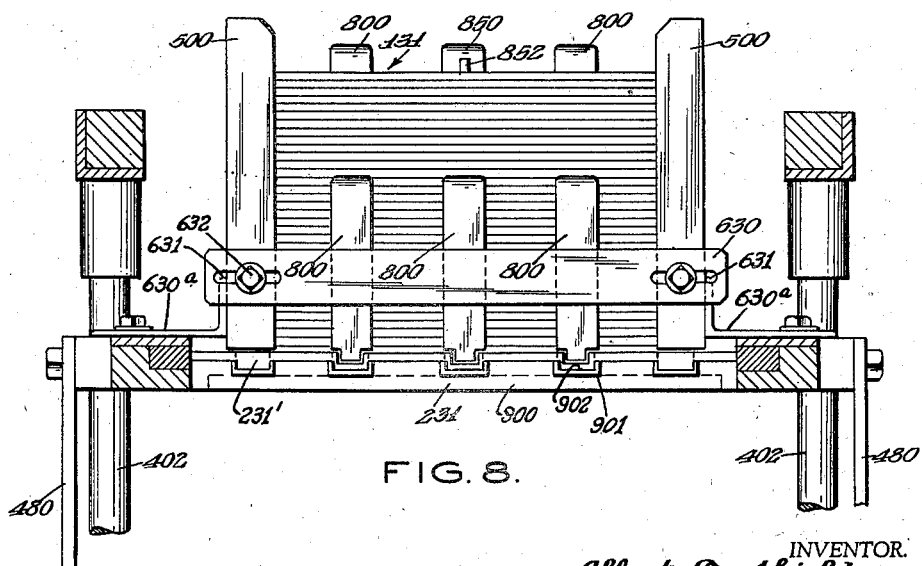
Figure 8 is a rear view of one of the stacks taken on line 8—8 of Figure 7 looking in the direction of the arrows.

As is seen, therefore, in Figures 7 and 8, the operating bar 231 may therefore in its movement towards the left, with respect to Figures 7 and 8, abut against the rear edge of the bottom sheet in the stack and push the same out through the front of the stack. When the bar passes beyond the front of the stack in ejecting the sheet, it then returns beneath the stack and the rear end of the bar at 904 may be chamfered (see also Figure 10) in order to facilitate its sliding under the stack.

Figure 9:
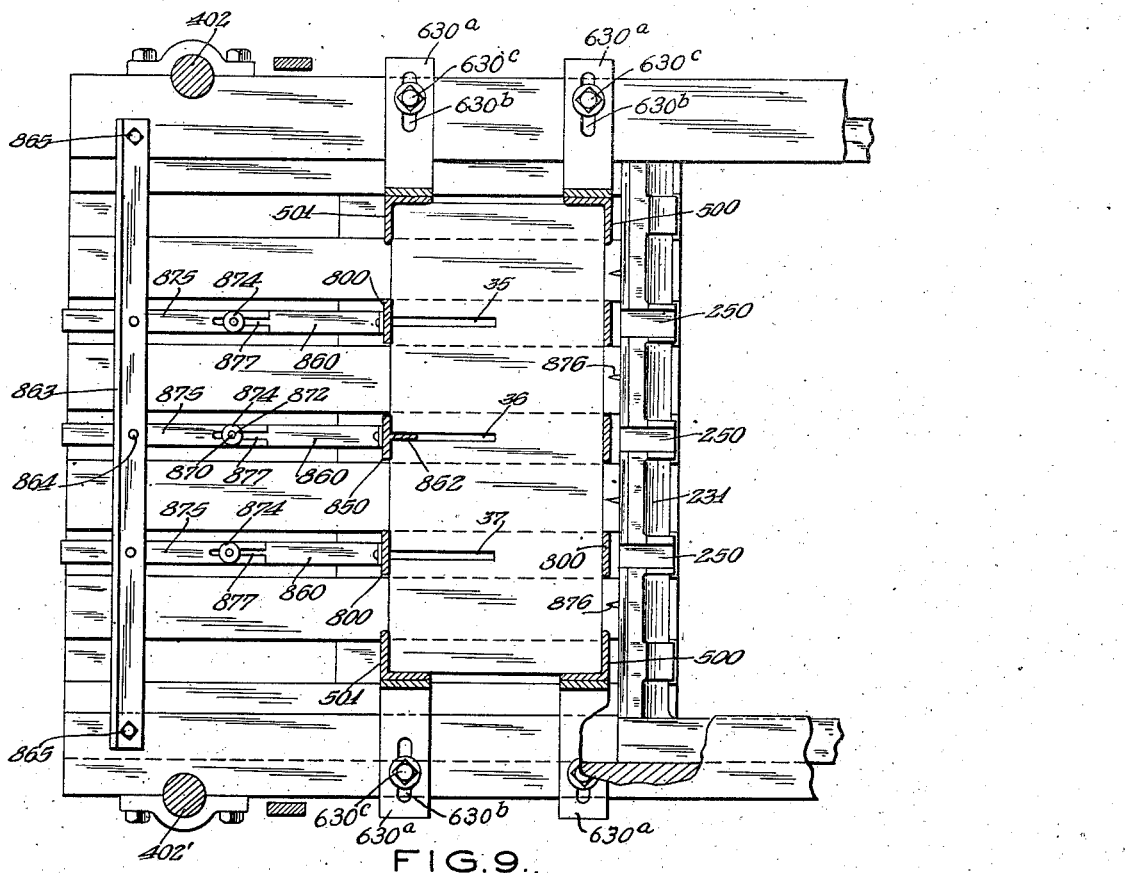
Figure 9 is a top plan view partly in cross section of the bed along which the notched blanks are fed, taken on line 9—9 of Figure 7, looking in the direction of the arrows.

The apparatus of my invention may be adjusted for different sizes of partitions. Thus the elements 500 and 501 which define the stack are mounted on brackets 630a (Figures 8, 9) which, as shown in Figure 9, are slidably mounted on the frame of the machine by slots 630b which receive threaded extensions of the frame which in turn are engaged by nuts 630c which may be loosened for adjustment of elements 500, 501 and then tightened to maintain the adjustment. Plates 630 and 630' are mounted respectively across elements 500 and 501 on threaded extensions of the said elements which pass through slots 631 and are held by adjusting nuts 632. Nuts 632 may be loosened to permit lateral adjustment of plates 630 and 630' and then tightened.

Figure 2:
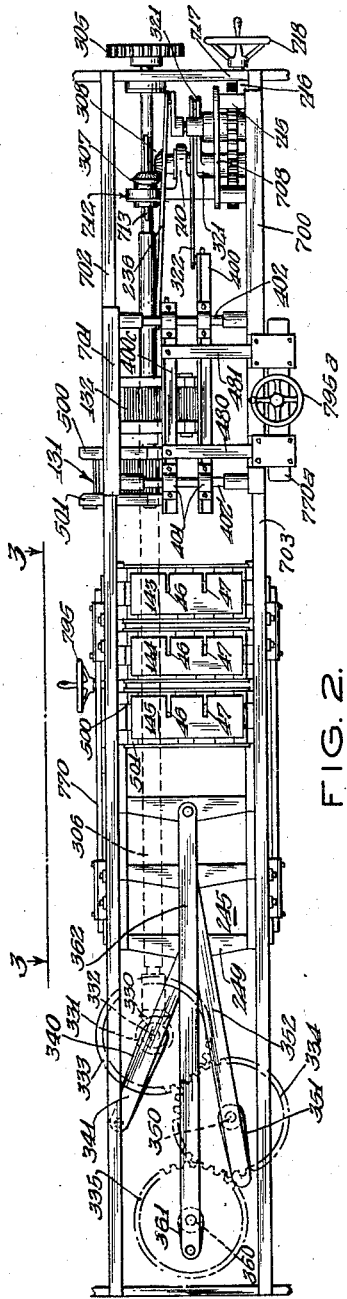

In order to adjust the mechanism also for different widths of sheets or for different heights of partitions, I have provided a means shown in Figure 2 for adjusting the set of stacks 131 and 132 to different positions within the apparatus. The posts 402', 402' which support the operating members 231 and 232 (seen in Figures 7, 8, and 11) which operate on stacks 131 and 132 are mounted on slide bars 700 and 701 which are slidable on the tracks 702 and 703 of the frame.

The shafts 313, 320 and 309 are also mounted on a platform 708 which is mounted on cross-bars 715 across the lower slide bars 700 which are slidable on tracks 703 (Figure 2). A frame member 710 carried by the platform 708 extends upwardly and rotatably engages the hollow sleeve 712 on which the bevel gear 307 rotates. Sleeve 712 is provided with a keyway which registers with the key 713 on shaft 306 so that the bevel gear 307 is rotated by shaft 306 no matter what position the bevel gear and its sleeve 712 occupy with respect to the shaft.

Since the bevel gear 307 and bevel gear 308 are hence supported by the same platform 708, they are always enmeshed with each other so that shaft 306 will always drive bevel gear 308. Accordingly, the slide bars 700, 701 and the platform 708 may be moved inwardly towards the center of the apparatus or outwardly away from the center of the apparatus without in any way interfering with the driving connection.

Hence the cross bars 715 of platform 708 are provided with threaded openings in which is engaged the longitudinal screw 716 which rotates in the bearing 717 in the frame of the machine. The end of the longitudinal screw 716 is provided with a handle 718 by which the same may be rotated to adjust the mechanism.

Figure 10:
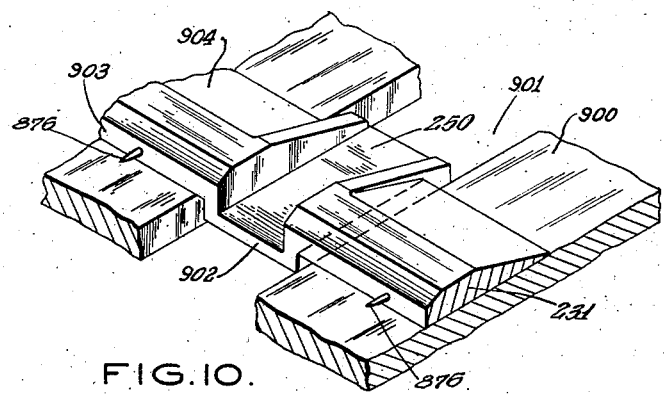
Figure 10 is a fragmentary view in perspective of the feeding bar.

In addition to using corner stack supporting and positioning elements as shown, for instance, in Figure 10, I may also, if that is desired, provide a plurality of stack positioning elements 800, 800 as seen in Figures 7 and 8.

The elements of the partition assembly machine may be modified in various ways. Thus for instance, the base plate 900 of Figures 7, 8 and 9 may be provided with a plurality of grooves 901, 901 in which rails 902, 902 of the operating bar 231' may operate. The edge 903 of the bar 231' is intended to serve as the operating or ejecting edge, while the rear edge of the bar is provided with the additional chamfers 904, 904, which because of their very slight slope facilitate the raising of the stack so that no portion of the bottom sheet will be torn during the return.

By providing the additional chamfers 904, 904, having the slight slope and exerting a minimum of upward pressure during any single instant of movement it is possible to dispense with the necessity for cams or other more complicated lifting elements.

In addition, as may readily be seen from an inspection of Figures 8 and 10, the kicker bar 231 may be grooved at 250, 250 in order to permit it to pass beneath the downwardly depending ends of the rear stacking elements 800.

After the kicker bar on each of the kick feed mechanisms engages the rear end of the lowermost blank on each of the stacks and starts moving the same forward it is possible for the blank to shift slightly, especially when it emerges from the stack and before it enters into assembly with the other blanks.

This shift, should it be greater than the width of the notches, may cause the edges of the blanks to meet where they are not notched and thus cause the blanks to buckle. In order to prevent the sliding of the blanks, I have provided a plurality of pins 876 at the forward end of each of the kicker bars which will on the forward movement of the kicker bars, engage the rear end of the blanks and prevent them from thus shifting.

My machine is primarily designed for the assembly of large size partitions which are ordinarily formed of corrugated board. The pins 876 thus do not pierce the rear edge of the blanks but rather enter into the ends of the flutes in the corrugated board. Since a plurality of pins each enter different flutes, an effective hold of the blank is obtained which prevents a shift thereof while it is moved forward.

During the return of the kicker bar, the pins, since they have not actually entered the material of the blank, are readily withdrawn without disassembling the partition. Even where partitions are to be assembled from solid material, the pins 876 enter only slightly into the back edge of the material and the frictional hold of the nested partition on the blank after it is assembled with other blanks is sufficient to hold the blank and permit the removal of the pins 876 upon the withdrawal of the kicker bar 231.

Accordingly, by this means any slightly lateral shift of any of the blanks in their plane which would result in lack of registry of the notches when they meet is obviated. In order to assist in retaining the blanks in the stack against the forward movement imparted by the kicker at the bottom, I may also in addition to providing the front guide plates 501, also provide the front stop bars 850. These stop bars, as will be obvious and as may readily be seen in Figure 7, clear the bottom of the stack so that the lowermost blank of the stack may emerge. The stop bars 850 may be held in place on the front frame members 501 in the same manner as are the rear stop bars 800 in Figure 8.

It will be obvious that in order that the blanks may be nested together into partition forming relationship, it is essential that the notches in the blanks be at the forward edges of the blanks. A careless operator may at times insert the blanks in the stacks with the notches facing rearwardly. In the latter event, when the blanks are urged forward, the solid un-notched edge of the rear of the blank meets the edge of the opposite blank and a buckling and tearing occurs which certainly causes destruction of that particular partition and which may even cause a stalling of the machine.

To prevent any such result, I have provided a means for ensuring that the blanks can be placed in the stacks only with the notches facing forward. For this purpose, as seen in Figures 7 and 8, the central front stacking member 850 in each stack has a rearwardly extending tongue 852 secured thereto, the said tongue extending into the stacking element itself.

The member 630' which carries the front stop members 850 may be adjusted laterally by loosening nuts 632 previously referred to and sliding the plate with respect to elements 501 so that tongue 852 will register with one of the notches in the group of blanks to be placed in that particular stack.

As is obvious from Figure 7, the tongue 852 here registers with the central notch 36 in each of the blanks which are placed in the stack. The tongue 852 need not extend down to the bottom of the stack and in fact should not extend to the very bottom since otherwise it would impede the feeding out of the lowest blank in the stack.

It will now be obvious that the tongue 852 by registering in the central notch 36 in each of the blanks, prevents shifting of the blanks in the stack itself at any time. This is a major function as hereafter described. But it will be clear that should any of the blanks be placed in the stack so that their notches face rearwardly rather than forwardly, only an unnotched portion of the blank will come into contact with the tongue 852 and the blank cannot then slide down into the stack.

In this case, the operator will immediately be apprised by the resistance offered the placement of the blank into the stack or by the resting of the blank at the top of the stack that it is not in its appropriate position. Accordingly, the operator will then reverse the blank so that the notch registers with the tongue 852. In doing so, all of the notches must necessarily be arranged at the forwarded edge of the blank.

Accordingly, it becomes impossible for the blanks to be stacked incorrectly. Since blanks may vary in width by as much as ⅜", the member 852 prevents them from sliding sideways so that the notches will be out of registry and maintains the blanks so that they will register with each other.

Occasionally, where partitions are assembled at very high speed and where the blanks are thus fed towards the partition assembly area at a very high rate, the blanks may tend to rise up slightly during their forward movement. It becomes necessary, therefore, to provide means for holding them down.

Accordingly, I provide each of the front stacking members 850 with a "hold-down" tongue 860 preferably of spring metal, the said tongue being secured in any suitable manner, as for instance, by the rivet 861 to the lower edge of each of the front stacking members 850.

As will readily be seen in Figure 9, each of the front stacking members 850 may carry such a tongue and the forward edges of each of these tongues may be interconnected for rigidity by the angle iron 863 which is likewise secured to these tongue members in any suitable manner as, for instance, by the rivet 864. This will impart sufficient weight to the forward edges of the tongues so that they will be depressed downwardly. Since the rear ends of each of the tongues are supported by the rivets 861 just clear of the upper surface of the lowest blank which is fed out of the stack, nothing impedes the movement of the blank out of the stack. At the blank moves forward, it may raise the outer ends of the tongues which rest on the bed of the supporting platform 900 and thus raise the angle iron or weight 863 at their outer end. The spring metal 860 of the tongue may be such as to provide at least some support for the tongues so that the outer ends of the tongues need not necessarily be pressed down on the bed of the machine (although this is preferred), but the tongues should be urged downwardly by the weight of the angle iron 863 so that some contact with the upper surface of the sheet is obtained, thus holding the sheet down.

Stop screws 865 may be provided at each of the outer ends of the angle irons 863 to space the tongues properly from the bed of the machine so that the sheets which are being fed forward may travel easily beneath the tongues.

At the same time the adjustment of the stop screws 865 should be such that the tongues hold the sheet down. Obviously, since the apparatus is adjustable by moving the stacks either forward or back from the assembly area and since it is desirable to extend the hold down means up to the assembly area at all times, it becomes necessary to make the tongues 860 adjustable.

Accordingly, as seen in Figures 7 and 9, the tongues 860 are not constructed as single continuous members but rather the original tongue 860 extends for only part of the full distance forwardly of the front stacking member 850.

It is provided at its outermost end with a stud 870 which extends upwardly therefrom and is secured to the upper surface thereof in any suitable manner preferably by welding. The stud 870 should preferably not extend down beyond the under surface of the tongue 860 since in that case there is a possibility that it might tear the paper which passes beneath unless it were rounded off or otherwise smooth.

The upper end of the stud 870 is threaded at 872 to receive the wing nut 874. By this means the forward extension 875 of the tongue 860 may be secured to the principal tongue 860. This forward extension is provided with a slot 877 which registers with the stud 870 so that the extension 875 may be drawn outwardly or pushed inwardly on the tongue 860 to any desired degree. When the length of the tongue has been adjusted by appropriate movement of the extension 875 inwardly or outwardly upon the principal tongue 860, the wing nut 874 is tightened and the adjustment has been completed.

Obviously, if desired, a plurality of such studs 870 may be used to prevent any lateral shifting of the extension 875 or the stud 870 may have a longitudinal base coinciding with the slot to prevent shifting of the extension 875. Again by this means, the possible lifting of the blank as it is moved forward rapidly and hence the possible misalignment thereof when it moves forward into the assembly area is prevented.

As has previously been pointed out, each of the guide rails 400, 400a, 400b may be adjusted for different spacings by movement of the ears or lugs 401 thereof upwardly or downwardly on the posts 402. In my prior machine, this adjustment was made by hand and when the rails 400 were lined up for the proper spacing so that the several sheets on one side of the machine were spaced apart by distances equal to the spaces between the notches on the other side of the machine, they were locked in place in any suitable manner.

My present invention contemplates the provision of means which will provide for a simplified simultaneous adjustment of the rails 400 on each side and hence of the spacings between the bases of the stacks to obtain the predetermined spacing. I have found a simplified means for simultaneously obtaining this spacing by a simple manual operation which involves merely the turning of a handle by the operator.

Referring now to Figures 3, 5 and 6, it will here be seen that the bottom rail 400 is fixedly mounted with respect to the posts 402. It may in certain unusual circumstances be made to be adjustable but preferably the nuts 450 on the lugs 401 of the bottom rails are so tightened against the posts 402 as to prevent movement of the bottom rail 400.

The reasons for this should be obvious since, where three rail members are to be adjustable at spaced intervals with respect to each other, only the upper two rail members need be moved while the lowest remains stationary. The intermediate rail member 400a is slidable along the post 402 as previously described. It is supported on each side by two bars 460 and 461; it is thus carried altogether by four bars in all.

The uppermost rail member 400b is likewise supported by two bars 470 and 471 and is thus carried at four points. The bottom end of each of the bars 460—461, 470—471, is adjustable so that the bars may be raised or lowered simultaneously. Thus when the four bars supporting the rail 400a are raised, this rail is moved upwardly; similarly with respect to the rail 400b.

It is also important in order to ensure correct operation that the bars supporting each set of rail members be raised simultaneously and to equal degrees.

Also where the rail 400a is moved upwardly by a specific distance from the rail 400, it is necessary that the rail 400b be moved upwardly so that it will be the same distance from the rail 400a.

In the cross sectional view of Figure 6, I have shown the manner in which the bar 461 is arranged so that it may be raised or lowered and this view should be examined particularly in connection with the lower right hand end of Figure 3. The lower frame 750 of the machine is slotted at 751 to receive the lower end of the bar 461. The outer edge of the frame member 750 beyond the slot 751 is provided with a short downwardly depending frame 752 which assists in defining the cam area 754 hereinafter described.

An outer plate 755 is secured to the frame memberber 750 in any suitable manner as for instance by the bolts 758. The lower end of the plate 755 carries the bar 760 secured thereto in any suitable manner as for instance by the bolts 761 and which serves further to define the cam area 754. An additional guide plate 763 is secured over the cam area 754 in any suitable manner.

The bar 461 is restrained so that it may only move vertically by reason of its confinement in the slot 751 in the frame 750. The sliding cam 770 enters into the cam area 754 and is provided with a slot 771 which registers with the pin 772 at the lower end of the bar 461. Slot 771 as may readily be seen from Figure 3 is at an angle to the axis of the sliding cam 770. Hence as the sliding cam 770 moves to the right with respect to Figure 3 the pin 772 will be forced upwardly.

This is obvious since the bar 461 which carries the pin can only move vertically. Likewise when the sliding cam plate 770 is moved to the left, the bar 461 will be moved downwardly.

The bar 460 at the opposite end also carries a pin 772a which is also slidable in the slot 771a of the cam plate 770. The construction of the various cam members on the left hand side of Figure 3 is exactly the same as the construction on the right hand side. Consequently, the movement to the right of the cam plate 770 will cause both the pins 772 and 772a to be forced upwardly and the movement to the left will force them downwardly. Since a similar sliding plate 770 is provided on both sides as seen in Figure 5, such movement will cause a corresponding rising or falling of the rail 400a. Each of the bars 471 and 470 which support the rail member 400b on each side is operated upon in exactly the same manner by the same movement of the sliding cam plate 770 and is guided in the same way.

Thus the pin 772c at the lower end of bar 471 registers with the slot 771c, and each of the pins 772b at the lower ends of the bars 470 registers with the slots 771d, in the sliding cam plates 770. The operation of these pins and slots is exactly the same as previously described.

Consequently the same movement which effects the raising and lowering of the rails 400a will result in the corresponding raising and lowering of the rails 400b. Since, however, the rail 400b must have a greater travel in either direction to maintain a spacing between rails 400b and 400a which is equal to the spacing between the rails 400a and 400, the slots 771c and 771d are at a greater angle to the longitudinal axis of the sliding cam plate 770 than are the slots 771 and 771a. This difference in angle is predetermined so that at any position of the sliding cam plates 770, the space between the rails 400b and 400a will be exactly the same as the space between the rails 400a and 400.

The movement of the cam plates 770 on each side may be obtained in any suitable manner. I prefer to interconnect the cam plates 770 on each side as seen in Figure 5 by the angular bracket 780 which carries the flange 781. Flange 781 supports threaded bearing blocks 782, 783 which are secured thereto in any suitable manner as, for instance, by the bolts 784.

Longitudinal screws 785, 786 are threaded respectively through the threaded bearing blocks 782, and 783 on the flange 781. These screws are rotatably supported in appropriate bearings in the frame member 790, the said bearings being so arranged that while the screws may readily rotate, they cannot move longitudinally.

The frame member 790 is mounted between the side frame 750 of the machine and has no motion with respect thereto. A shaft 791 is rotatably supported at one end in the bearing 792 carried by the frame member 790 and at the other end in an appropriate bearing 793 in one of the side frames 750. The said shaft extends through the side frames 750 and through the longitudinal slot 794 in the bottom cam plate 770. The slot is sufficiently wide so as to permit full sliding movement of the cam plate 770 without interference therewith by the shaft 791.

The outermost end of the shaft 791 carries the handle 795 by means of which it may be manually rotated. Shaft 791 has keyed thereto the bevel gear 796 which meshes with bevel gear 797 which in turn drives the longitudinal screw 786. Similarly shaft 791 also carries the bevel gear 798 which meshes with the bevel gear 799 which in turn drives the longitudinal screw 785.

It will now be clear that rotation of handle 795 will result in rotation of the shaft 791 and hence in rotation of the bevel gears 796—797 and 798—799, thus resulting in rotation of the screws 786 and 785. This will result in a movement in one direction or the other of the interconnecting member 780 thus moving the sliding cam plates 770 and effecting the adjustment previously described.

As will be clear from an examination of Figures 1 and 2 where a twelve cell partition is to be made, three stacks are necessary on one side and two stacks on the other. Consequently, the adjustment on one side must be adapted for the spacing of three sets of rails from each other. This has already been described. The adjustment on the other side need be adapted only for the spacing of two sets of rails from each other. This is shown in Figure 4 which is the right hand side of the machines of Figures 1 and 2.

The manner of adjustment is here exactly the same with the exception, however, of the fact that the sliding cam plate 770a on each side need have only one slot 771e at each end to register with the pins 772e of the bars 480, 481 which support the rails 400c on each side. Here again the rails are supported by two members on each side, thus providing four points of support. The sliding cam plates 770a on each side operate in exactly the same manner and are adjusted by the handle 795a in the manner previously described. Obviously, the lowest set of rails 400d in the assembly need not be adjusted since appropriate spacing is provided merely by raising and lowering the group of rails 400c.

Appropriate dial or index means may be provided on or in connection with the frame member and associated with the handle 795 or a suitable pointer on the shaft 791 to guide the operator in the making of an adjustment so that it will not be necessary for him to make any experimental runs or complex measurements to determine whether an appropriate adjustment has been obtained.

Thus, the same type of adjustment means may be used to raise one platform or several platforms.

By the various means herein described, the operation of my partition assembling machine is facilitated. While the machine itself is operable without any of the additional novel elements herein specifically described, the utilization of these elements in connection with the partition assembling machine facilitates the operation thereof and makes it possible for skilled or even careless operators to adequately tend the same.

In the foregoing I have described my invention and the various improvements on my partition assembling machine only in connection with preferred commercial embodiments thereof.

Many variations in the various particular constructions or in the adaptations of these particular improvements should now be obvious to those skilled in the art. Accordingly, I prefer to be bound not by the specific disclosures herein, but only by the appended claims.

I claim:

1. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, said blanks being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for simultaneously adjusting certain of the guide members for certain of the stacks on one side of the assembly position to obtain a selected spacing among all of said stacks.

2. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, said blanks being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for simultaneously adjusting certain of the guide members for certain of the stacks on one side of the assembly position to obtain a selected spacing among all of said stacks, said means comprising a plurality of supporting members for each adjustable guide member; a cam plate engageable with supporting members of each guide member; and means for selectively moving said cam plate.

3. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, said blanks being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for simultaneously adjusting certain of the guide members for certain of the stacks on one side of the assembly position to obtain a selected spacing among all of said stacks, said means comprising a supporting leg extending from each guide member; a projection on each leg; a cam plate; a slot in said cam plate for each leg adjustable thereby; the projections of the legs entering into the respective slots; said cam plate being movable longitudinally along its axis; said slots being inclined to said axis.

4. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, said blanks being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for simultaneously adjusting certain of the guide members for certain of the stacks on one side of the assembly position to obtain a selected spacing among all of said blanks, said means comprising a supporting leg extending from each guide member; a projection on each leg; a cam plate; a slot in said cam plate for each leg adjustable thereby; the projections of the legs entering into the respective slots; said cam plate being movable longitudinally along its axis; said slots being inclined to said axis at different angles thereto in accordance with the relative degree of movement required of the guide members for adjustment thereof to different sizes.

5. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets, said blanks being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for simultaneously adjusting certain of the guide members for certain of the stacks on one side of the assembly position to obtain a selected spacing among all of said stacks, said means comprising a plurality of supporting members for each adjustable guide member; a cam plate engageable with supporting members of each guide member; and means for selectively moving said cam plate longitudinally along its axis; said means comprising a screw rotatable in a fixed bearing and having no longitudinal movement with respect thereto; and a member carried by said cam plate; said member having a threaded opening engaged by said screw; means for rotating said screw.

6. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for adjusting one of the guide members for spacing the same from the other guide members.

7. An apparatus for assembling partitions from a plurality of notched blanks, comprising means for positioning one set of stacks of blanks and an opposite set of stacks of blanks, the sets of stacks of blanks being spaced from each other by the width of an assembled partition, the blanks in the stacks of each set extending in planes parallel to the blanks of each of the stacks of its set; one set of stacks being inclined at an angle of the order of 45° from the vertical on one side of the apparatus, the opposite set of stacks being inclined at a complementary angle from the vertical on the other side of the apparatus, the blanks in one set of stacks extending in planes normal to the blanks of the opposite set of stacks; the bases of each set of stacks being in stepped relation, the base of the stack closest to the opposite set being uppermost, the bases of the stacks further removed from the opposite set being progressively stepped downwardly and means for simultaneously feeding blanks from opposite sets being fed toward each other into assembled position by a single continuous movement from their respective stacks to assembled position, the blanks of each stack progressively moving downward by gravity as each bottom blank is fed out, and guide members for said blanks and said feeding means communicating with the base of each stack, and means for adjusting one of the guide members for one of the stacks on one side of the assembly position, said means comprising a plurality of supporting members for said adjustable guide member; a cam plate engageable with all of the supporting members of said guide member; and means for selectively moving said cam plate.

ALBERT F. SHIELDS.